United States Patent Office 3,364,920
Patented Jan. 23, 1968

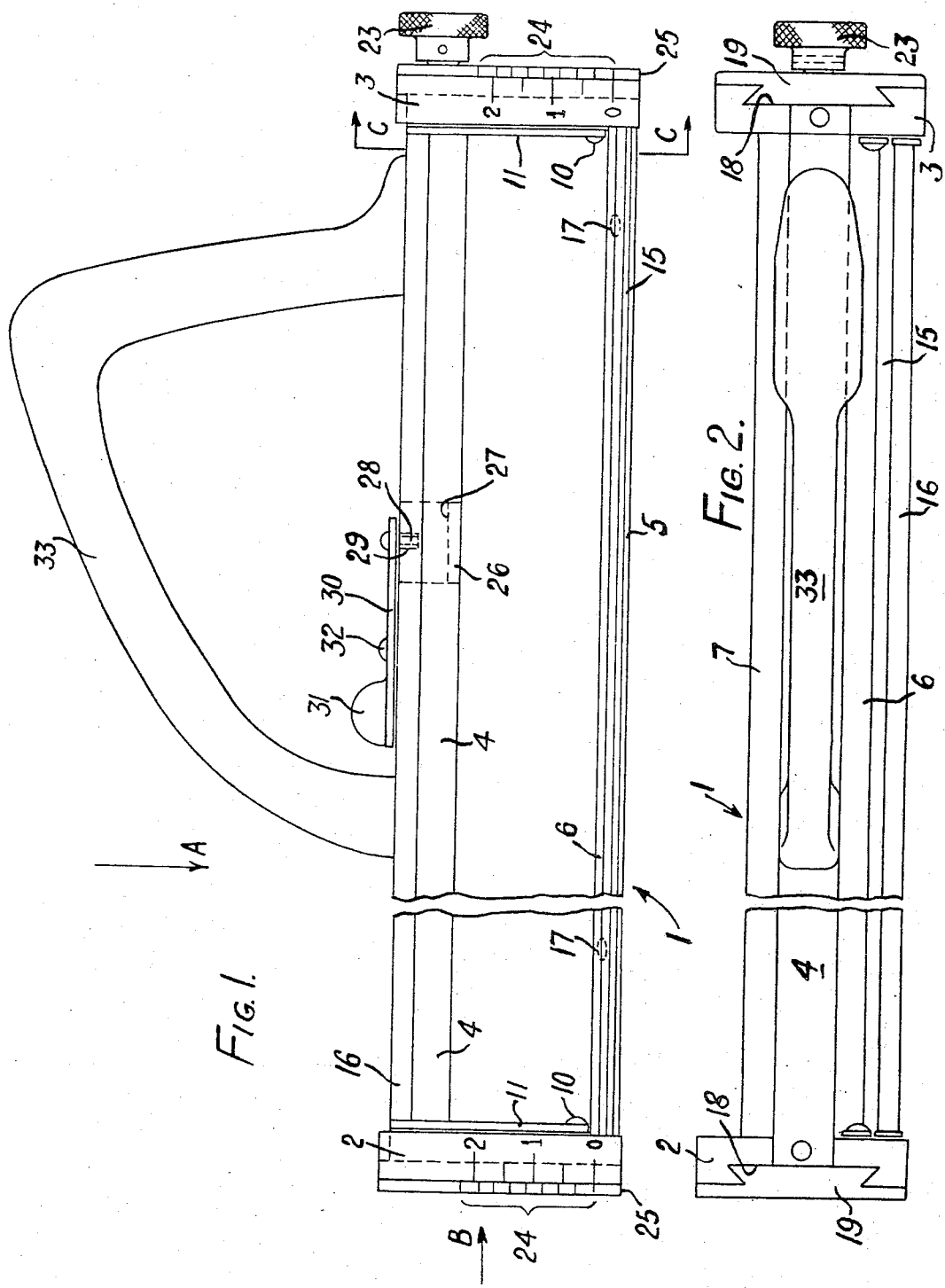

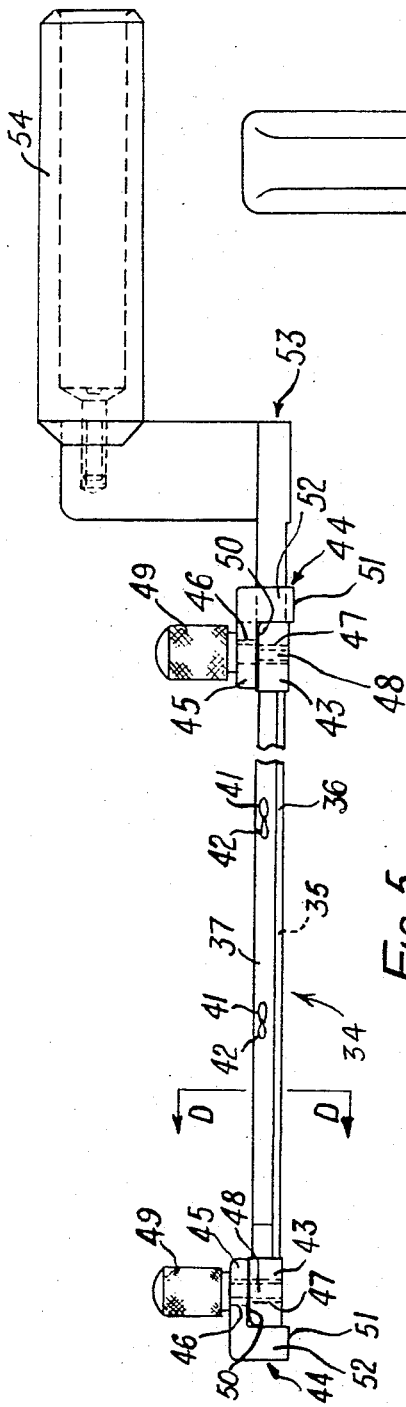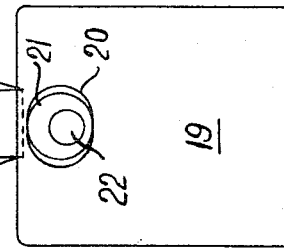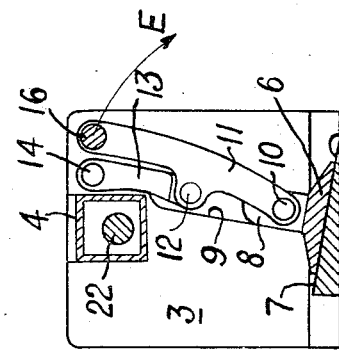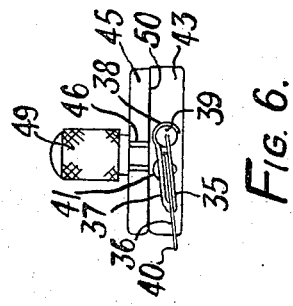

3,364,920
METHOD OF PREPARING SKIN FOR GRAFTING AND GRAFTING KNIFE FOR USE THEREIN
Donald S. Ross, 3 Keir Drive, Bishopbriggs, Glasgow, Scotland
Filed Aug. 21, 1964, Ser. No. 391,204
Claims priority, application Great Britain, Aug. 21, 1964, 33,626/63
13 Claims. (Cl. 128—305)

ABSTRACT OF THE DISCLOSURE

A method of preparing skin for grafting wherein the skin is attached by adhesive to a flat surface and fat tissue is removed from the skin by means of a knife supported on said surface. The knife for carrying out the method has an elongated straight-edge cutting blade mounted in operative connection with support shoes, the height of said shoes being adjustable relative to the cutting edge of the cutting blade.

---

This invention relates to an improved method of preparing skin for grafting and to a grafting knife for use in the performance of the method.

Hitherto, when a person has been involved in an accident or has suffered from a disease which necessitates the removal of a portion of skin, with attached fat tissue, from the person, the portion of skin being intended to be separated from the fat tissue and grafted back on to the person, the portion of skin has been separated from the fat tissue using a grafting knife which is supported on the skin, the skin being, in turn, supported on the layer of associated fat tissue. This known method suffers, however, from the disadvantage that it is virtually impossible to prevent undulations in the skin while the skin is being separated from the fat tissue so that the portion of removed skin has frequently had attached thereto areas of fat tissue which must be removed by further separation with the grafting knife or alternatively, or in addition, holes have been inadvertently cut in the portion of skin.

The time required for performing this operation may thus be considerable and this time is further increased if the portion of skin is of large area since, in the known method, the skin has to be separated from the fat tissue in relatively narrow strips which are subsequently stitched before grafting to the person under treatment.

It is an object of the present invention to provide a method of preparing skin for grafting which is considerably less time consuming than the known method, and it is a further object of the invention to provide a grafting knife for use in the performance of the method.

The method of preparing skin for grafting according to the invention comprises the steps of placing a portion of skin with attached fat tissue on a planar surface to which the skin is attached by a contact-type adhesive, removing the fat tissue from the skin by means of a knife presenting a straight-edged cutting blade, during which the knife is supported on said planar surface, and removing the portion of skin from the planar surface for grafting on to the patient.

A grafting knife according to the invention, for use in the performance of the method according to the invention, comprises a straight-edged cutting blade mounted in a frame presenting handle means, the frame also presenting at each end of the blade a support shoe, said shoes being adjustable in height relative to the cutting edge of the blade so that, when the knife is in use, the thickness of skin left on the planar surface may be varied by adjustment of the support shoes, which operatively support the knife on the planar surface.

In order that the invention may be more fully understood and more readily carried into effect the same will now be described more fully with reference to the accompanying drawings in which FIG. 1 is a side view of a grafting knife according to one embodiment of the invention, FIG. 2 is a plan view in the direction of the arrow A of FIG. 1, FIG. 3 is an end view in the direction of the arrow B of FIG. 1, FIG. 4 is a sectioned view on the line C—C of FIG. 1, FIG. 5 is a side view of a grafting knife according to a further embodiment of the invention, and FIG. 6 is a sectioned view on the line D—D of FIG. 5.

Referring to the embodiment of the invention illustrated in FIGS. 1 to 4 inclusive, 1 denotes generally a rectangular frame comprising two spaced, parallel end blocks 2, 3 interconnected by two spaced, parallel members, namely a tube 4 of square cross-section and a baseplate 5.

A clamping plate 6, between which and the baseplate 5 a straight-edged wafer thin cutting blade 7 is operatively clamped, presents at each end thereof a guide plate 8 which is rigidly secured to the clamping plate 6 and which is slidably mounted within a guide groove 9 formed on the inside surface of the appropriate end block 2, 3, the plates 8 being slidable in the grooves 9 in a direction at right angles to the plane of the blade 7.

To each guide plate 8 there is pivotably connected, about a pivot pin 10, one end of a link 11, the link 11 being pivotably connected, intermediate its ends and about a pivot pin 12, to one end of a link 13, the other end of which is pivotably connected, about a pivot pin 14, to a fixed point on the inside surface of the appropriate end block 2, 3. The pivotal axes of the pivot pins 10, 12, 14 are all parallel to one another and to the cutting edge 15 of the blade 7. On pivotal movement of the link 11, about the pivot pin 10 and in the direction of the arrow E (FIG. 4) the guide plate 8 is caused to slide along the guide groove 9 towards the pivot pin 14 thus moving the clamping plate 6 away from the baseplate 5 and permitting the blade 7 to be removed from, or inserted, between the clamping plate 6 and the baseplate 5.

The clamping plate 6 is returned towards the baseplate 5 by pivotal movement, again about the pivot pin 10, of the link 11 in the opposite direction to the arrow E.

When the clamping plate 6 is in proper clamping engagement with the baseplate 5 with the blade 7 clamped therebetween the pivotal axis of the pin 12 is disposed a small distance to the side of an imaginary straight line interconnecting the pivotal axes of the pins 10, 14, to which the link 11 pivots when moved in the direction of the arrow E.

The above-described arrangement comprising the plate 8 and the links 11 and 13, with the associated pivot pins 10, 12, 14, is hereinafter referred to, for simplicity, as a toggle lock.

A rod 16 interconnects the ends, remote from the pivot pins 10, of the links 11 so that operation of the two toggle locks, in unison, may be achieved by actuation of the rod 16.

A plurality of spaced projections 17 are presented by the surface of the baseplate 5 adjacent to the clamping plate 6, the projections 17 being disposed through correspondingly formed and spaced apertures in the blade 7 when the blade 7 is operatively clamped between the baseplate 5 and the clamping plate 6. Correspondingly formed and spaced recesses may also be formed in the adjacent surface of the clamping plate 6, the projections being received within said recesses when the blade 7 is operatively clamped between the baseplate 5 and the clamping plate 6.

As will be appreciated the projections 17 may alternatively be presented by said surface of the clamping plate 6 with the recesses formed in said surface of the baseplate 5.

The outside surface of each end block 2, 3 is formed with a vertical slot 18 which is of dove-tail form in cross-section and with which a correspondingly formed slide 19 is in mating engagement. An aperture 20 is formed in each slide 19, a rotatable cam 21 of circular form being disposed within each aperture 20. The two cams 21 are rigidly mounted on, or integrally formed with, a rotatable shaft 22 which passes through the tube 4 and is journalled in bearings in the end blocks 2, 3. On one end of the shaft 22 is non-rotatably mounted a knurled knob 23 by means of which the shaft 22, and so also the cams 21, may be rotated. The cams 21 are identical and are in circumferential alignment relative to the shaft 22. When the shaft 22 is turned the cams 21 cause the slides 19 to move, in unison, upwards or downwards relative to the end blocks 2, 3 depending on the direction of turning of the shaft 22. The dimensions of the cams 21 and of the apertures 20 are such that irrespective of the setting of the cams 21 there is no free play, in the direction of the slots 18, between the cams 21 and the apertures 20. The slides 19 cannot therefore be moved relative to the end blocks 2, 3 without turning of the shaft 22.

One side surface of each end block 2, 3 and the adjacent side surface of the associated slide 19 are coplanar and present, in combination, a Vernier scale denoted generally by the reference 24. By means of the appropriate scale 24 the height setting of the support surface 25 of each slide 19 relative to the cutting edge 15 of the blade 7 may readily be checked, the adjacent surfaces of the baseplate 5 and of the clamping plate 6 being inclined, relative to the surfaces 25 of the slides 19, at the desired angle of cutting of the blade 7 when in use. Since the movements of the slides 19 relative to the associated end blocks 2, 3 are in unison only one of the end blocks 2, 3 and the associated slide 19 need present a Vernier scale 24 but it is preferred that both end blocks 2, 3 and the associated slides 19, present Vernier scales 24 so that a check can readily be made to ensure that there is no malfunctioning of the knife caused, for example, by torsional twisting of the shaft 22.

A block 26 is disposed within the tube 4, the block 26 being formed with a bore 27 through which the shaft 22 passes and within which the shaft 22 may be freely rotated.

A screw 28 passes freely through a hole formed in a wall of the tube 4, the screw 28 being in screw-threaded engagement with a screw-threaded bore 29 formed in the block 26. The bore 29 is disposed substantially at right angles to, and communicates with, the bore 27. One end of an arm 30 is non-rotatably secured to the screw 28, the other end of the arm 30 presenting a protuberance 31 so shaped as to facilitate finger actuation of the arm 30 to turn the screw 28. A fixed stop 32 is mounted on the tube 4 and serves to restrict the possible degree of turning of the screw 28 within predetermined limits which are such that the screw 28 cannot accidentally or maliciously be unscrewed completely from engagement with the block 26, which would permit the block 26 to move axially within the tube 4 with subsequent difficulties in realigning the bore 29 in the block 26 with the hole in the tube 4, through which the screw 28 freely passes, to reengage the screw 28 with the bore 29 in the block 26.

Securely attached to, and protruding from, the wall of the tube 4 in which the hole through which the screw 28 freely passes is a handle 33 of the piston-grip type.

Referring to the embodiment illustrated in FIGS. 5 and 6, 34 denotes generally a frame comprising a baseplate 35. A straight-edged, wafer cutting blade 36 is operatively clamped between the baseplate 35 and a clamping plate 37, one longitudinally extending edge 38 of which is of part-circular form and so embraces a rod 39, to which the longitudinally extending edge of the baseplate 35, remote from the cutting edge 40 of the blade 36, is secured, that the clamping plate 37 is pivotally and longitudinally slidably movable relative to the baseplate 35. A plurality of longitudinally spaced bayonet connections 41 are presented by the surface of the baseplate 35 adjacent to the clamping plate 37, the connections 41 operatively passing through correspondingly spaced apertures formed in the blade 36 and being engaged, by correspondingly spaced slots 42 formed in the clamping plate 37 and of known form in relation to connections of bayonet type, on longitudinal movement of the clamping plate 37 relative to the baseplate 35. The blade 36 is thereby securely clamped between the baseplate 35 and the clamping plate 37.

The ends of the rod 39 are fixedly secured in end blocks 43. Mounted in association with each block 43 is a slide 44 of substantially L-shape in cross-section, one limb 45 of each slide 44 being formed with a bore 46 therethrough which is in alignment with a screw-threaded bore 47 formed in the associated end block 43.

A screw-threaded rod 48 is in engagement with the bore 47 in each end block 43 and freely passes through the bore 46 in the limb 45 of the associated slide 44, the end of the rod 48 on the side of the slide 44 remote from the associated end block 43 being formed with a knurled head 49 which facilitates rotation of the rod 48 and between which and the associated end block 43 the limb 45 of the slide 44 may be securely clamped. Shims 50 are insertable between the adjacent surfaces of the limb 45 of each slide 44 and the associated end block 43 thereby to vary the setting of the end face 51 of the limb 52 of each slide 44 relative to the associated end block 43 and so to vary the height setting of the cutting edge 40 of the blade 36 relative to said end faces 51.

Rigidly secured to one of the slides 44 through a cranked arm fabrication 53 is a bar type handle 54.

Referring to both embodiments of the invention the various parts constituting the knife are formed of stainless steel, or of any other material or materials which may readily be sterilized either chemically or in an autoclave.

In practice, the affected portion of skin with attached fat tissue is placed on a flat surface such as a sheet of, for example, specially prepared plate glass or metal hereinafter referred to for simplicity as the sheet of glass, the skin being in contact with and being attached to, by means of a contact-type adhesive, the upper surface of the sheet of glass. If necessary, the surface of the sheet of glass to which the skin is attached may be roughened to provide improved frictional contact.

The knife is then mounted on the sheet of glass with the support surfaces 25 of the slides 19 (FIGS. 1 to 4) or with the end faces 51 (FIGS. 5 and 6) in contact therewith, the height setting of the surfaces 25 or of the faces 51, relative to the cutting edge 15, or 40, of the blade 7, or 36, and hence the height setting of the cutting edge 15, or 40 relative to the upper surface of the sheet of glass, having been adjusted to the required value by turning of the knurled knob 23, or by the insertion, or removal from, between the adjacent surfaces of the limbs 45 of the slides 44 and the associated end blocks 43 of shims 50. The support surfaces 25, or the end faces 51, constitute the support shoes. When the required height setting has been attained the shaft 22 is locked against rotation within the bore 27 in the block 26 by turning of the screw 29, or the limbs 45 of the slides 44 and the associated end blocks 43 are securely clamped, to prevent further insertion or removal of shims 50, by tightening of the rods 48.

The angular setting of the blade 7, or 36, is not affected by adjustment of the height setting of the surfaces 25, or of the faces 51, relative to the cutting edge 15, or 40, of the blade 7, or 36 so that the blade 7, or 36, may operate under all operating conditions at the optimum setting, this feature of the present invention constituting an improvement over known types of grafting knives in which variation in the height setting of the cutting blade is achieved by adjustment of a support roller disposed in advance of the blade, the angular setting of the blade being varied when the setting of the roller is altered.

The slides 19, or the limbs 52 of the slides 44, straddle the portion of skin, and attached fat tissue, on the sheet of glass so that as the cutting edge 15, or 40 of the blade 7, or 15, is passed through the skin or through the attached fat tissue by oscillation of the knife the fat tissue is separated from the skin. The portion of skin is then removed manually from the sheet of glass and is ready for grafting to the patient. A film of sterile lubricating jelly may be introduced between the surfaces 25, or the faces 51, and the bearing surface of the sheet of glass to reduce the frictional resistance during oscillation of the knife.

As will be understood the method according to the present invention permits a portion of skin of substantially uniform thickness to be separated in a single piece from attached fat tissue, the dimensions of the portion of skin being limited only by the length of the cutting edge 15, or 40, of the blade 7, or 15, and the magnitude of the oscillatory movement of the knife when in use.

What is claimed is:

1. A knife for removing fat tissue from detached skin comprising an elongated straight edge cutting blade, a frame within which said cutting blade is mounted, handle means attached to said frame, a pair of support shoes adjustably secured to said frame and disposed one at each end of said cutting blade below the level of the cutting edge of said cutting blade, said support shoes being adjustable in height relative to the cutting edge of the cutting blade and being adapted to support the knife on a flat surface on which the skin is placed.

2. A grafting knife as claimed in claim 1 in which shims are insertable, and removable from, between adjacent surfaces of said support shoes and of parts of the knife, relative to which the height setting of the cutting edge of said cutting blade is fixed, thereby to adjust the height of said support shoes relative to the cutting edge of said cutting blade.

3. A grafting knife as claimed in claim 1 incorporating a baseplate and a clamping plate, between which said cutting blade is operatively clamped, and toggle lock means through which said baseplate and said clamping plate may be moved towards and away from one another.

4. A grafting knife as claimed in claim 1 incorporating a baseplate and a clamping plate, between which said cutting blade is operatively clamped and which are pivotally interconnected, and bayonet connection means by which said baseplate and said clamping plate may be secured together when said cutting plate is clamped therebetween.

5. A grafting knife as claimed in claim 1 in which there is rotatable cam means acting between said support shoes and parts of the knife which are fixed relative to the cutting edge of said cutting blade, the setting of said cam means determining the height setting of said support shoes relative to the cutting edge of said cutting blade.

6. A grafting knife as claimed in claim 5 in which separate cam means, comprising in combination said rotatable cam means, acts on each said support shoe, a rotatable shaft non-rotatably interconnects said separate cam means, said separate cam means, which are of identical cam contour, being disposed in circumferential alignment relative to said rotatable shaft so that when the height settings of said support shoes, relative to the cutting edge of said cutting blade are adjusted the movements of said support shoes are in unison.

7. A grafting knife as claimed in claim 6 in which at least one of said support shoes and an adjacent part of the knife which is fixed relative to the cutting edge of said cutting blade are so calibrated as to indicate the height setting of said support shoe relative to the cutting edge of said cutting blade.

8. A grafting knife as claimed in claim 6 including locking means which may be actuated to secure said cam means, when in any desired angular setting, against rotation thereby preventing adjustment of the height of said support shoes relative to the cutting edge of said cutting blade.

9. A grafting knife as claimed in, claim 8 in which said locking means comprises a non-rotatable member within which said shaft interconnecting said separate cam means is freely rotatable, screw-threaded means in screw-threaded engagement with said non-rotatable member and on actuation of which said shaft may be brought into non-rotatable engagement with said member.

10. A method of preparing skin for grafting comprising steps of placing a portion of skin with attached fat tissue on a flat surface, attaching said portion of skin to said flat surface by a contact-type adhesive, removing said fat tissue from said portion of skin by means of movement of a knife presenting an elongated straight-edged cutting blade over the skin, during which movement the knife is supported on said flat surface, and removing said portion of skin from said flat surface for grafting on to the patient.

11. A method as claimed in claim 1 in which at least the portion of said flat surface to which said portion of skin is attached is roughened to provide improved frictional contact between said portion of skin and said flat surface.

12. A method as claimed in claim 10 in which the knife, during removal of said portion of skin from said fat tissue, is supported on said flat surface by means of support shoes presented by the knife, and at least one of said support shoes is disposed to one side of said portion of skin and the remainder of said support shoes is disposed to the opposite side of said portion of skin.

13. A method as claimed in claim 10 in which a film of sterile lubricant is disposed between the parts of the knife supporting the knife on said flat surface and said flat surface.

References Cited

UNITED STATES PATENTS 2,221,565 11/1940 Bailey _____ 30—167

FOREIGN PATENTS 680,029 10/1952 Great Britain.

OTHER REFERENCES

Bard-Parker Co. Inc., Reese Dermatome (Figure 1) August 1952.

J. B. Brown M.D. and F. McDowell M.D., Skin Grafting of Burns, pages 90, 73, 82, 84 and 45 relied on.

LOUIS G. MANCENE, *Primary Examiner.*

RICHARD A. GAUDET, *Examiner.*

G. E. McNEILL, *Assistant Examiner.*